June 12, 1962 H. H. DOERR 3,038,665
TRACTOR ATTACHED SPRAY APPARATUS
Filed Nov. 16, 1959 2 Sheets-Sheet 1
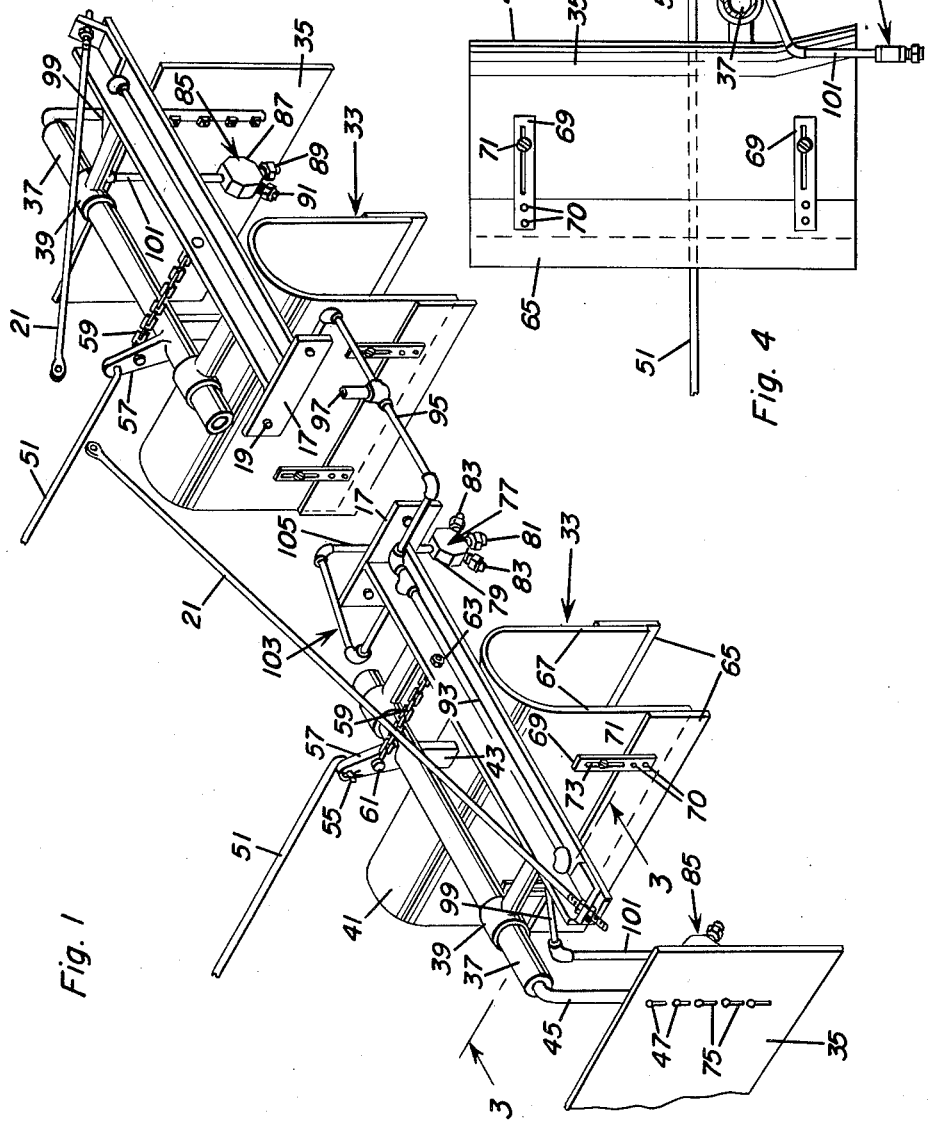
Herbert H. Doerr
INVENTOR.

June 12, 1962 H. H. DOERR 3,038,665
TRACTOR ATTACHED SPRAY APPARATUS
Filed Nov. 16, 1959 2 Sheets-Sheet 2
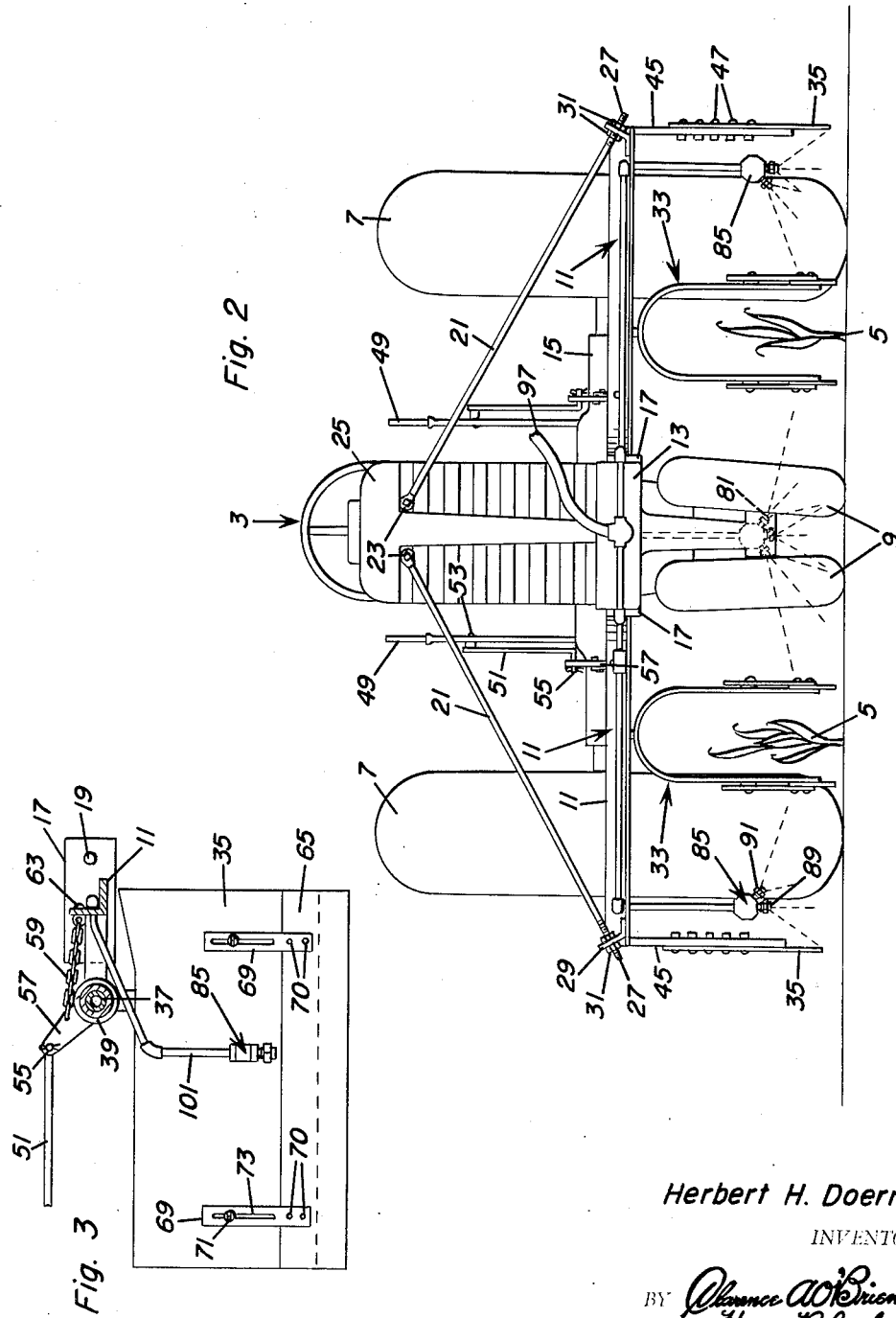
Herbert H. Doerr
INVENTOR.
BY Clarence A. O'Brien
and Harvey B. Jacobson
Attorneys

United States Patent Office 3,038,665
Patented June 12, 1962

3,038,665
TRACTOR ATTACHED SPRAY APPARATUS
Herbert H. Doerr, Wausa, Nebr.
Filed Nov. 16, 1959, Ser. No. 853,281
7 Claims. (Cl. 239—104)

This invention relates to improvements in weed destroying spray apparatus for attachment to a tractor and use in destroying weeds between rows of plants in a field.

The primary object of the invention is to provide apparatus for attachment to opposite sides of a tractor to spray weed destroying liquid on weeds growing between rows of young corn between which the wheels of the tractor run, and without the liquid spray contacting the corn and killing the same.

Another object is to provide apparatus according to the foregoing including effective shields for preventing the liquid spray from contacting the corn in the rows between which weeds are being sprayed.

Another object is to provide spray apparatus in accordance with the foregoing embodying shields for shielding at least two rows of corn at opposite sides of each row, and shields for shielding at one side thereof rows of corn next to those being shielded at opposite sides thereof.

Still another object is to provide in such apparatus shields for the above purpose mounted for swinging from a lowered operative position between rows of corn into raised idle position above the corn so as to be out of the way when not in use and when the tractor is being turned.

Yet another object is to provide in such apparatus highly efficient multiple spray nozzle units for spraying weeds at opposite sides of two rows of corn in a manner such that the spray will not contact the corn in the rows.

Yet another object is to provide for swinging the shields easily and readily from the tractor.

Other objects are to provide spray apparatus according to the foregoing which is of simple, practical construction, readily attachable to and detachable from a conventional farm tractor, and which is substantially fool-proof and may be manufactured at a compartatively low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the spray apparatus of this invention detached;

FIGURE 2 is a view in front elevation of the apparatus attached to a farm tractor and drawn to a smaller scale;

FIGURE 3 is a fragmentary view in vertical transverse section taken on the line 3—3 of FIGURE 1; and FIGURE 4 is a view similar to FIGURE 3 illustrating one of the shields raised into idle position.

Referring to the drawings by numerals, the spray apparatus of this invention, and which is designated generally by the numeral 1 has been shown for illustration purposes as attached to a tractor 3 for spraying weeds at opposite sides of two rows 5 of young corn straddled by the tractor rear wheels 7 and between which the tractor front wheels 9 travel.

The spray apparatus 1 comprises as its basic components a pair of like booms 11 which are preferably angle iron bars and which are attached to opposite sides of the tractor chassis frame 13 to extend horizontally from opposite sides of said frame 13 laterally thereof in alignment between the rear wheels 7 and front wheels 9 at substantially the level of the rear axle housing 15 of the tractor 3 so that said boom will clear young corn which will be cleared by said axle housing 15.

The booms 11 are detachably attached to the chassis frame 13 by means of a pair of cross plates 17 on the inner ends of said booms 11 having bolt holes 19 therein for detachably attaching said plates to said chassis frame 13 by bolts, not shown.

A pair of truss rods 21 converge upwardly from the outer ends of the booms 11 and are bolted, as at 23 to the tractor body 25 with outer ends 27 extended through a pair of angle brackets 29 on the outer ends of the booms 11, said rods having nuts 31 threaded thereon on opposite sides of the brackets 29 for adjustably securing the rods 21 to the booms 11 to keep said booms 11 from sagging.

A pair of elongated, substantially rectangular and upright shields 33 of inverted U-shape are carried by the booms 11, respectively, for straddling and covering the two rows 5 of corn, and a pair of upright rectangular shield plates 35 spaced outwardly and opposite the shields 33 parallel therewith so that the pair of shield plates 33 straddle the two rows 5 in outwardly spaced apart relation to the shields 33, and whereby the two rows 5 are shielded at opposite sides thereof by the shields 33 and rows, not shown, of corn at opposite sides of the two rows 5 are shielded from spray from spray nozzle units presently described.

As will be seen, the booms 11 carry respectively a shield 33 and a shield 35 for travel along the rows 5 with the tractor 3.

The shields 33, 35 of the respective booms 11 are mounted on said booms for swinging downwardly and forwardly into lowered shielding position, as shown in FIGURES 1 and 3, or upwardly and rearwardly into idle raised position for transporting above the corn, when not in use, or when the tractor 3 is being turned, and as shown in FIGURE 4 in connection with one of the shields 33. For this purpose, the respective shields 33, 35 of each boom 11 are mounted thereon by the following means.

A rock shaft 37 in the rear of each boom 11 parallel therewith is mounted in a pair of rearwardly extending laterally spaced bearing brackets 39 on the boom 11. The shield 33 is suitably fixed at its top 41 on the crank arm 43 on the rock shaft 37 and intermediate the ends of said shield. A terminal reduced crank arm 45 on the outer end of the rod shaft 37 is bolted, as at 47, to the intermediate portion of the shield plate 35.

Means is provided for rocking each rock shaft 37 in opposite directions to raise and lower the shields 33, 35 thereon comprising a hand lever 49 suitably pivoted on and upstanding from the axle housing 15 at one side of the tractor and which is operatively connected to a related rock shaft 37 by a rod 51 pivoted thereon as at 53 and pivoted, as at 55 to an upstanding crank arm 57 on the related rock shaft 37. Link chains 59 are terminally connected to the booms 11, as at 63 and, as at 61, to the crank arms 57 of the rock shafts 37 mounted on the booms, and whereby to limit rocking of said rock shafts 37 in one direction to establish the lowered position of the shields 33 and the shield plates 35.

A pair of bottom extension plates 65 are provided on opposite sides 67 of each shield 33 and are mounted for adjustment toward and from the ground, when the shield is lowered, by bars 69 bolted to said plates, as at 70 and bolts 71 in said sides 67 extending through longitudinal slots 73 in said bars 69. Thus the sides 67 of the shields 33 are extensible to vary the spacing thereof relative to ground in the lowered position of said shields 33, as occasion may require according to ground and weed conditions. The shield plates 35 are provided with slots 75 through which the before mentioned bolts 47 extend and whereby said shield plates 35 may be adjusted similar to shields 33.

A spray nozzle unit 77 is provided in suspended position midway between the shields 33 and comprises a hollow head 79 having a central depending spray nozzle 81 thereon for spraying downwardly directly with the axis of the nozzle perpendicular to the ground, and a pair of angularly disposed spray nozzles 83 thereon at opposite sides of the central nozzle 81 inclining outwardly and downwardly from the nozzle 81 to spray downwardly toward the bottom of the shields 33, the arrangement being such that the ground between the rows of corn straddled by the shields 33 can be adequately sprayed with the weed destroying liquid to kill weeds between said rows 5.

A pair of spray nozzle or jet units 85 are provided between each of the shields 33 and the adjacent shield plate 35, each of the units 85 comprising a depending hollow head 87 with a depending spray nozzle 89 having its axis perpendicular to the ground, for directing spray downwardly, and an angularly disposed depending spray nozzle 91. inclined downwardly and outwardly relative to the spray nozzle 89 and toward the adjacent shield 33 to direct spray toward said shield. As will be understood, the spray nozzles 81, 83 and the spray nozzles 89, 91 are disposed in planes such that the spray nozzles 83, spray in opposite directions transversely of the rows 5 of the corn and the spray nozzles 91 direct the spray similarly. The spray nozzles 89 are generally parallel with the shield plates 85 to obviate spray from said nozzles 89 being thrown outwardly under said plates 35.

Pipe means is provided on the booms 11 for suspending the spray nozzle units 77, 85 at a suitable distance from the ground and supplying the same with a weed destroying liquid under pressure and which comprises the following.

A manifold pipe 93 extending along the booms 11 with a U-shaped central portion 95 for straddling the front end of the tractor body 25, and which is provided with a suitably connected hose line 97 for connection to a suitable supply source of weed destroying liquid under pressure, not shown, on the tractor 3. The supply from the source may be controlled in any usual manner. A pair of terminal right angle branch pipes 99 on the manifold pipe 93 extends rearwardly through the booms 11 and with depending pipe sections 101 connected to the spray nozzle heads 85 to supply liquid thereto. A right angled branch pipe 103 extends rearwardly through one of the booms 11 with a depending pipe section 105 intermediate the shields 33 connected to the spray nozzle head 79 for supplying liquid to said head. The branch pipe 99 and the branch pipe 101 are suitably fixed in the booms 11 to secure the pipe means on said booms 11.

The use and operation of the invention will be readily understood. As the tractor 3 travels along the rows 5, the shields 33 are carried by the booms 11 in suspended position along and in straddling relation to the two adjacent rows 5 of corn, and the shields 35 are carried by the booms 11 in suspended position outwardly of and alongside the rows 5, while the spray nozzle unit 77 is carried in suspended position midway between the rows 5 to spray weeds between said rows, and the spray nozzle units 85 are carried in suspended position along the rows 5 in outwardly spaced relation thereto. Thus the ground at opposite sides of the rows 5, and the growing weeds are thoroughly sprayed while the corn plants in the rows 5, as well as those in adjoining rows are completely shielded from the spray. The shields 33 and the shield plates 35 may be raised into idle position at will, in the manner already described when their use in lowered position is not desirable, as for instance when the tractor is transporting the spray apparatus from place to place, or turning in a field. In this connection, it is to be noted that the spray nozzle units 77, 85 are suspended at a sufficient height from the ground so that they will not interfere with transportation of the apparatus or turning thereof. The shields 33 and the shield plates 35 may be raised so that the spray nozzle units 77, 85 may be used alone in spraying and destroying weeds in unplanted fields.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for spraying weeds with weed destroying liquid comprising a boom, means for fixing the boom securely to one side of a tractor in horizontal outwardly extending position for movement by a tractor over row of plants in a field, pipe means on said boom for discharging liquid destroying liquid, a plurality of downwardly discharging spray jet units carried by said pipe means and spaced along said boom for spraying at opposite sides of a row of plants standing in a field, a shield of substantially inverted U-shape for straddling the plants of said row to prevent liquid being sprayed from said units from contacting the plants in said row, an upright plate for shielding the plants in a row adjacent said first named row against contact of the liquid therewith, and means mounting said inverted substantially U-shaped shield and said plate on said fixed boom in suspended positions spaced from each other and said spay jet units for swinging from a lowered shielding position into a raised idle position above the plants.

2. The combination of claim 1, said last named means comprising a rock shaft journaled to said boom at the rear thereof and having said shield and plate secured thereto whereby said shield may automatically follow the contour of the ground, and manual means on the tractor for rocking said shaft.

3. The combination of claim 2, said boom being L-shaped in cross-section, said pipe means including a manifold pipe extending along said boom and secured thereto within the angle formed by the legs of the L-shaped cross section, and branch pipes on said manifold suspending said spray jet units.

4. The combination of claim 3, said inverted U-shaped shield having bottom plates adjustable thereon for varying the height of said inverted U-shaped shield from the ground when lowered.

5. In combination with a tractor, apparatus for spraying a destroying liquid on weeds comprising boom means, means fiexdly attaching the boom means to the tractor so as to extend laterally therefrom on at least one side thereof and for movement thereby over plants in a field, pipe means supported on said boom to discharge weed destroying liquid, a plurality of downwardly discharging spray jet units carried by said pipe means and spaced along said boom means for spraying weeds at opposite sides of rows of plants standing in the field, a plurality of shields laterally spaced between said spray jet units of inverted U-shape for straddling a plurality of rows of the plants to prevent liquid sprayed from said units from contacting the plants in said rows, and means pivotally mounting said plurality of shields to said boom for swinging from a lowered shielding position into a raised idle position above said plants, said plurality of shields further including flat upright shield plates pivotally mounted on outer ends of the boom for shielding plants in rows alongside the rows straddled by said shields of inverted U-shape, said spray jet units including respectively a spray nozzle perpendicular to the ground in a field and another spray nozzle inclined laterally relative to the first named nozzle.

6. In combination with a tractor, apparatus for spraying a destroying liquid on weeds comprising boom means, means fixedly attaching the boom means to the tractor so as to extend laterally therefrom on at least one side thereof and for movement thereby over plants in a field, pipe means supported on said boom to discharge weed destroying liquid, a plurality of downwardly discharging spray jet units carried by said pipe means and spaced along said boom means for spraying weeds on opposite sides of rows of plants standing in the field, a plurality of shields laterally spaced between said spray jet units of inverted U-shape for straddling a plurality of rows of the plants to prevent liquid sprayed from said units from contacting the plants in said rows, and means pivotally mounting said plurality of shields to said boom for swinging from a lowered shielding position into a raised idle position above said plants, said pipe means comprising a manifold pipe extending along and secured to the top surface of said boom means, and branch pipes depending from said manifold pipe and suspending said spray units, the boom means and entire spraying apparatus being mounted on the front end of the tractor whereby the driver may observe them in operation, and a stop provided on the boom means for limiting downward movement of the spraying apparatus.

7. In combination with a tractor, apparatus for spraying a destroying liquid on weeds comprising boom means, means fixedly attaching the boom means to the tractor so as to extend laterally therefrom on at least one side thereof and for movement thereby over plants in a field, pipe means supported on said boom to discharge weed destroying liquid, a plurality of downwardly discharging spray jet units carried by said pipe means and spaced along said boom means for spraying weeds at opposite sides of rows of plants standing in the field, a plurality of shields laterally spaced between said spray jet units of inverted U-shape for straddling a plurality of rows of the plants to prevent liquid sprayed from said units from contacting the plants in said rows, and means pivotally mounting said plurality of shields to said boom for swinging from a lowered shielding position into a raised idle position above said plants, said means for mounting said shields comprising rock shafts, means journalling said rock shafts on and parallel to said boom means for rocking movement, means rigidly securing said shields to said rock shafts for rocking movement therewith, and manual means connected to said rock shafts for rocking them from said tractor.

References Cited in the file of this patent

UNITED STATES PATENTS

| | | |
|---|---|---|
| 2,663,973 | White | Dec. 29, 1953 |
| 2,740,664 | Yates | Apr. 3, 1956 |